Sept. 2, 1952  E. R. FAUSSET ET AL  2,608,802
CAM GRINDING MACHINE
Filed April 1, 1950  10 Sheets-Sheet 1

INVENTORS
ERNEST R. FAUSSET
MAX E. TODD
BY Willits Hardman & Fehr
THEIR ATTORNEYS

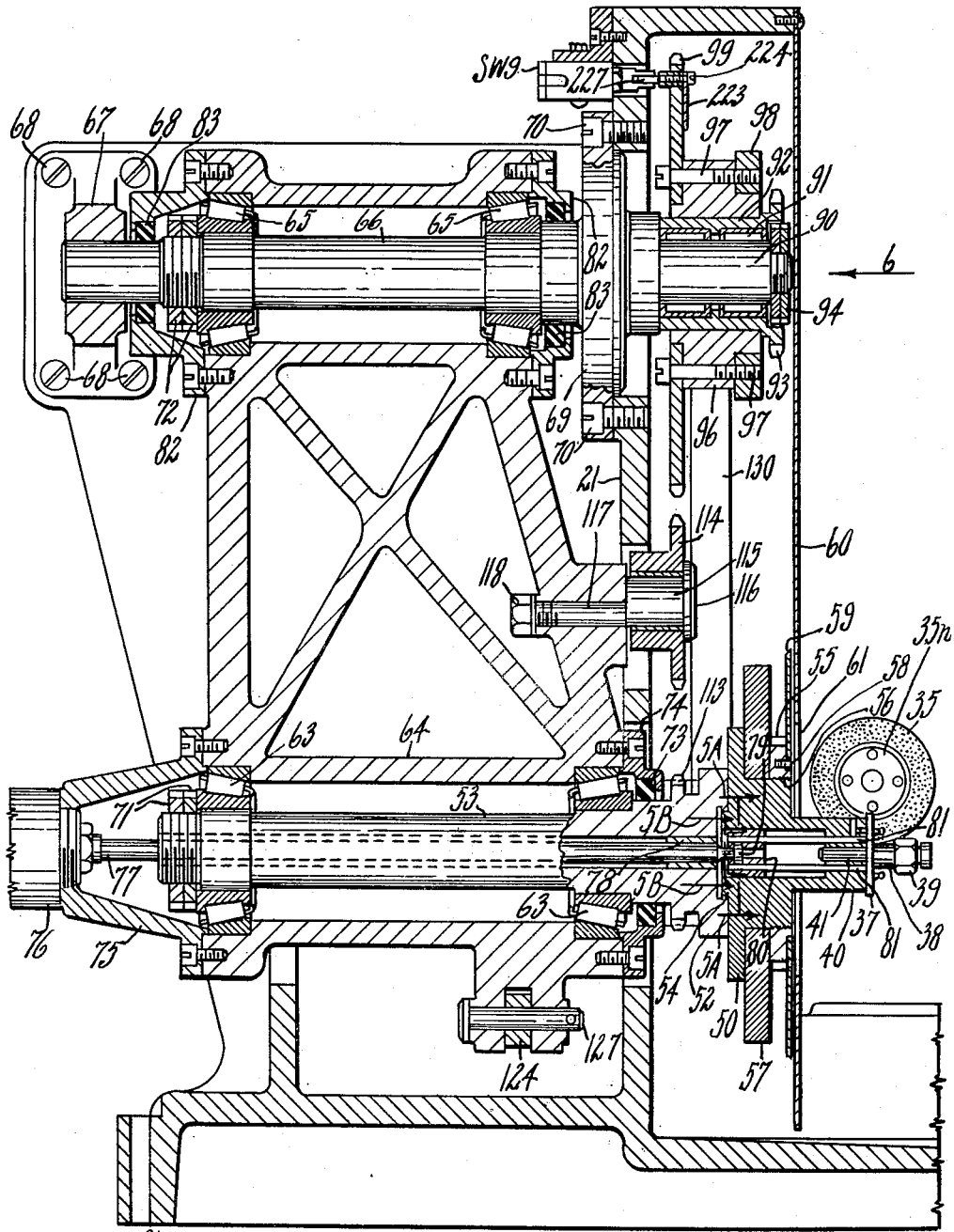

Sept. 2, 1952  E. R. FAUSSET ET AL  2,608,802
CAM GRINDING MACHINE
Filed April 1, 1950  10 Sheets-Sheet 4
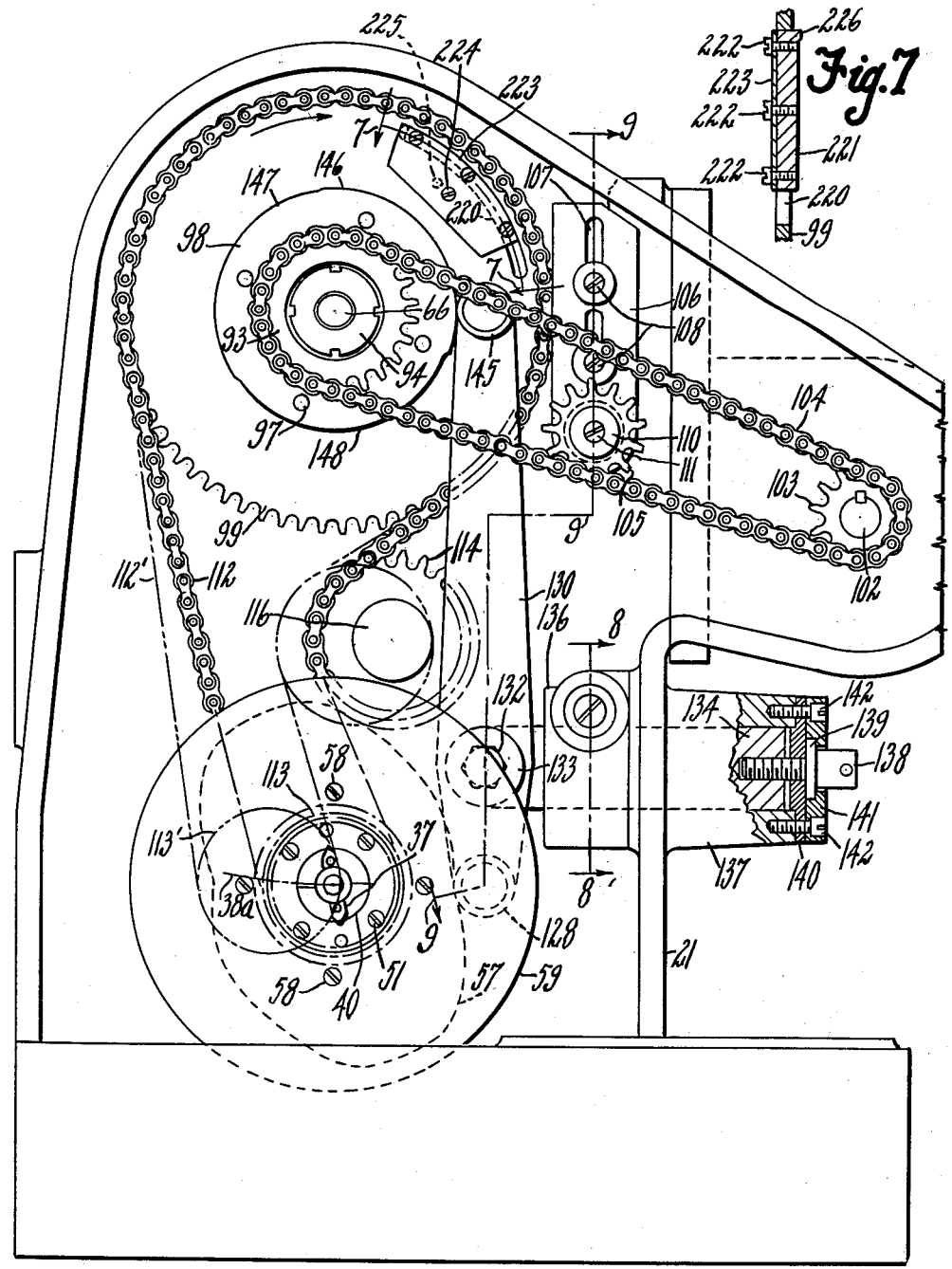
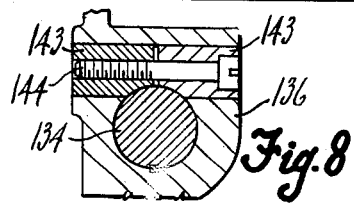
INVENTORS
ERNEST R. FAUSSET
MAX E. TODD
BY Willits Hardman & Fehr
THEIR ATTORNEYS

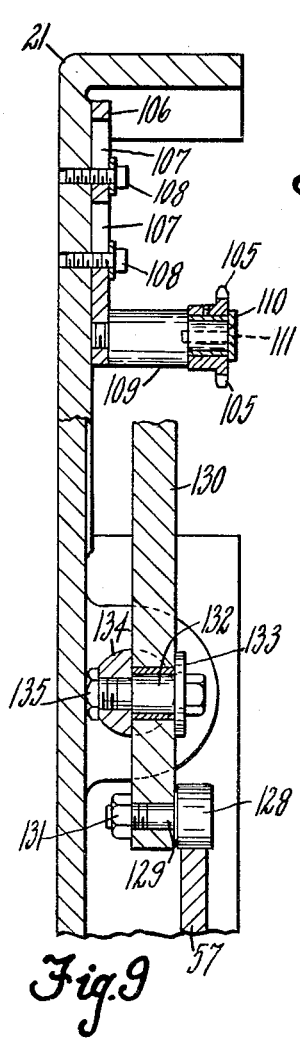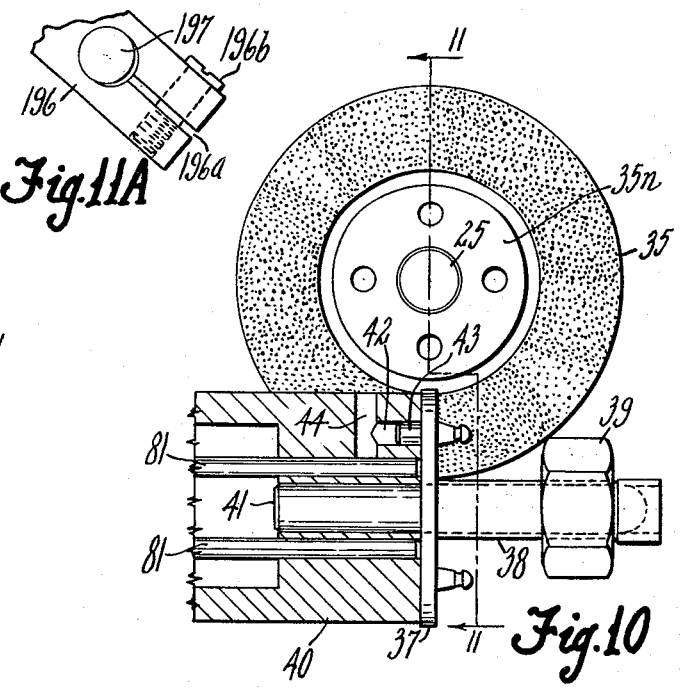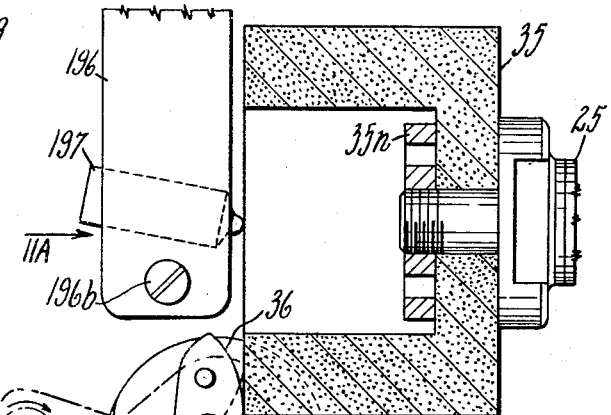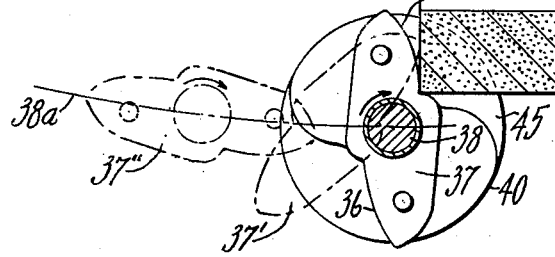

INVENTORS
ERNEST R. FAUSSET, MAX E. TODD
BY Willits Hardman & Fisher
THEIR ATTORNEYS

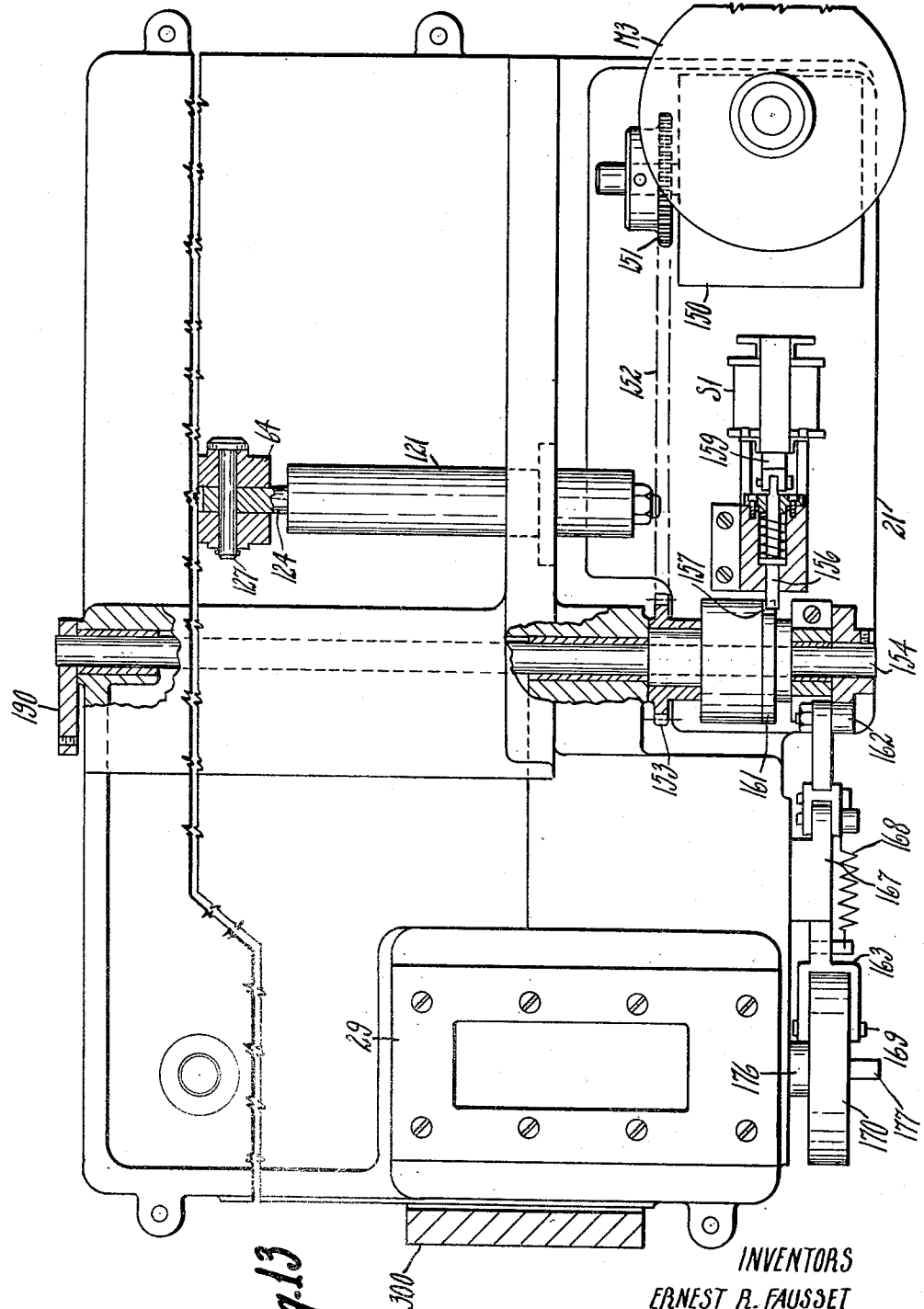

Sept. 2, 1952 E. R. FAUSSET ET AL 2,608,802
CAM GRINDING MACHINE
Filed April 1, 1950 10 Sheets-Sheet 8
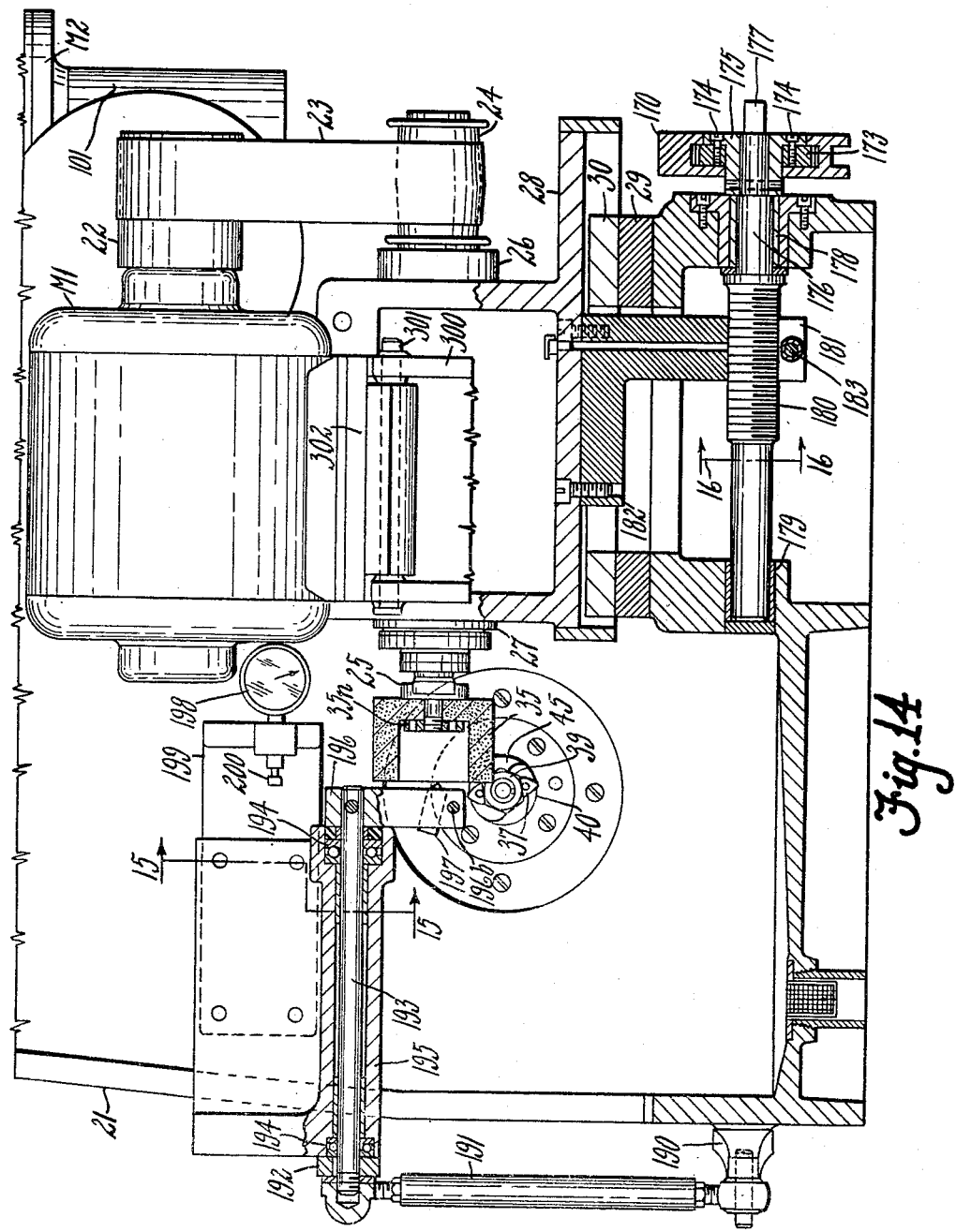
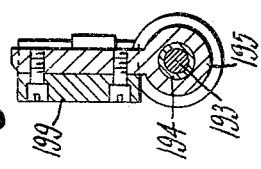
INVENTORS
ERNEST R. FAUSSET
MAX E. TODD
BY Willits
Hardman & Fehr
THEIR ATTORNEYS INVENTORS
ERNEST R. FAUSSET
MAX E. TODD
BY Willits Hardman
and Fehr
THEIR ATTORNEYS Patented Sept. 2, 1952

2,608,802

UNITED STATES PATENT OFFICE 2,608,802

CAM GRINDING MACHINE

Ernest R. Fausset, Ingalls, and Max E. Todd, Windfall, Ind., assignors to General Motors Corporation, Detroit, Mich., a corporation of Delaware Application April 1, 1950, Serial No. 153,476

11 Claims. (Cl. 51—127)

1

This invention relates to cam grinding machines and its object is to provide a machine for grinding cam surfaces on edges of arms of a metal lever, said arms extending oppositely from the axis of rotation of the lever. To accomplish this, the machine provides for rotation of the lever on its axis and, concurrently, for bodily movement of the lever while edges of the arms are presented in succession for abrasion by the plane surface of a cup-shaped grinding wheel. Each arm engages, at first, an outer portion of the grinding wheel and rocks on the wheel while bodily movement of the arm is controlled by a master cam. As the arm rocks, it engages successively portions of the wheel decreasing in distance from its axis of rotation. It is more particularly an object of the invention to retard gradually the speed of rotation of the lever as it rocks on the wheel to compensate for gradual reduction of speed of abrasion by the wheel.

A further object of the invention is to provide for abrasion of the lever arms to the desired contour in a plurality of steps which take place in succession automatically.

A further object is to provide for automatically dressing the wheel after a predetermined number of grinding operations have been performed and to provide, when the wheel has been worn away, a certain amount for automatically preventing further operation of the machine and for signalling to the attendant that the wheel should be replaced.

Further objects and advantages of the present invention will be apparent from the following description, reference being had to the accompanying drawings, wherein a preferred embodiment of the present invention is clearly shown.

In the drawings:

Fig. 5 is a sectional view on lines 5—5 of Figs. 2 and 3.

Figs. 5A and 5B are fragmentary sectional views taken, respectively, on lines 5A—5A and 5B—5B of Fig. 5.

Fig. 6 is a view in the direction of arrow 6 of Fig. 5, a cover plate having been removed.

2

Figs. 7, 8 and 9 are sectional views, respectively, on lines 7—7, 8—8 and 9—9 of Fig. 6.

Fig. 10 is an enlargement of the lower right end portion of Fig. 5.

Fig. 11 is a sectional view on line 11—11 of Fig. 10.

Fig. 11A is a fragmentary view in the direction of arrow 11A of Fig. 11.

Figure 2:
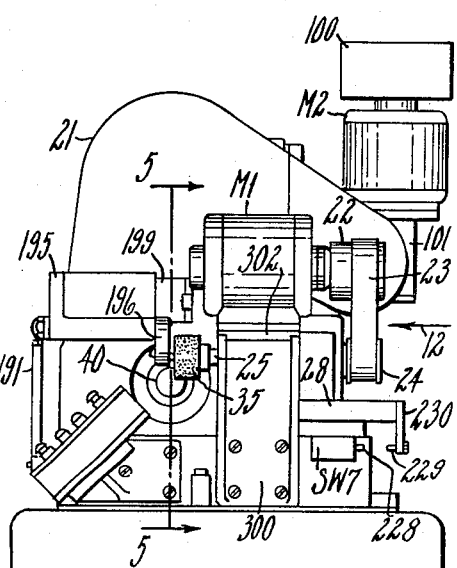
Fig. 2 is a view in the direction of arrow 2 of Fig. 1.
Figure 12:
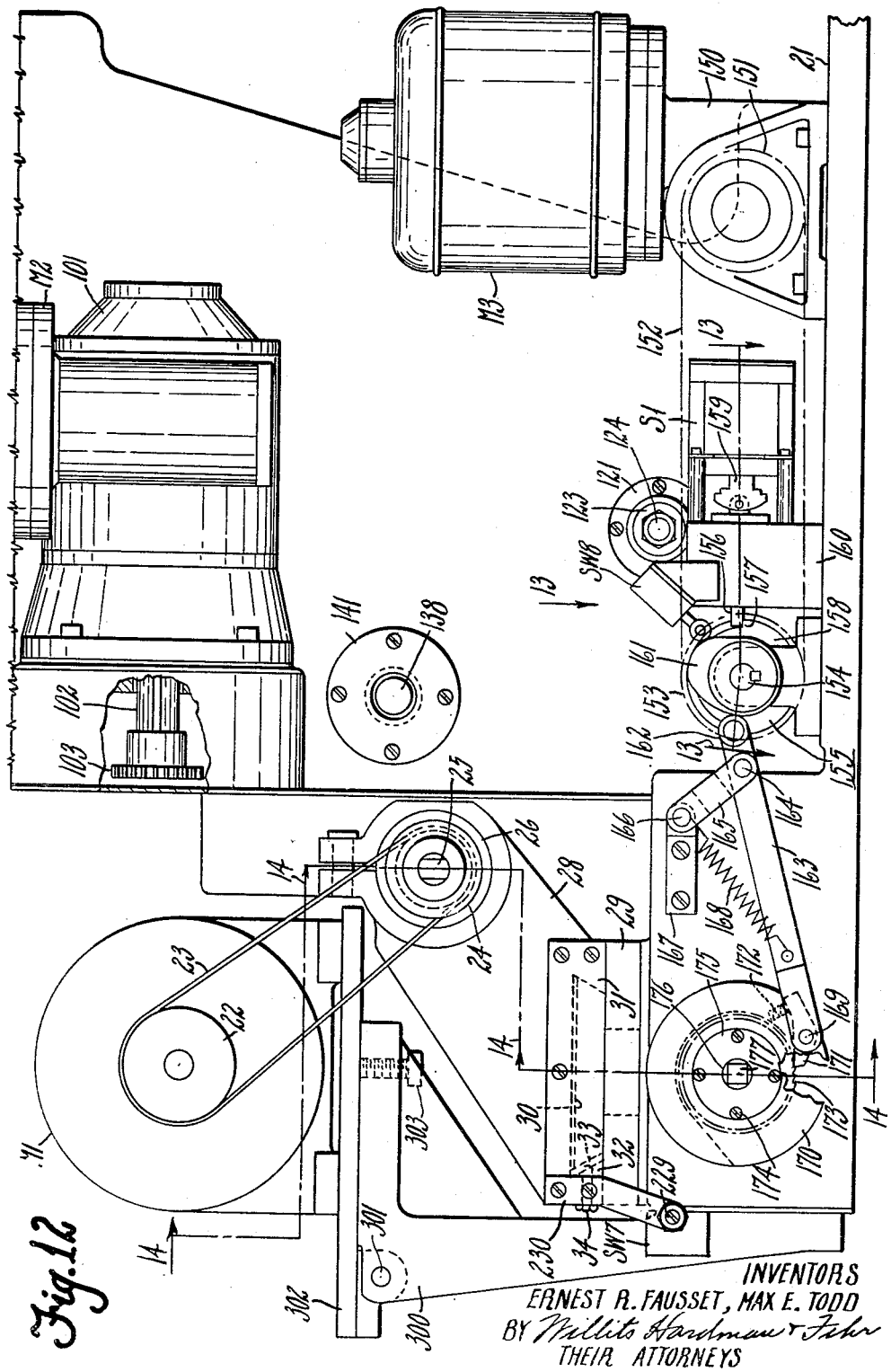

Fig. 12 is a view in the direction of arrow 12 of Fig. 2.

Fig. 13 is a view in the direction of arrow 13 of Fig. 12, the part in section being substantially on line 13—13 of Fig. 12.

Fig. 14 is a sectional view on line 14—14 of Fig. 12.

Figs. 15 and 16 are sectional views taken, respectively, on lines 15—15 and 16—16 of Fig. 14.

Figure 17:
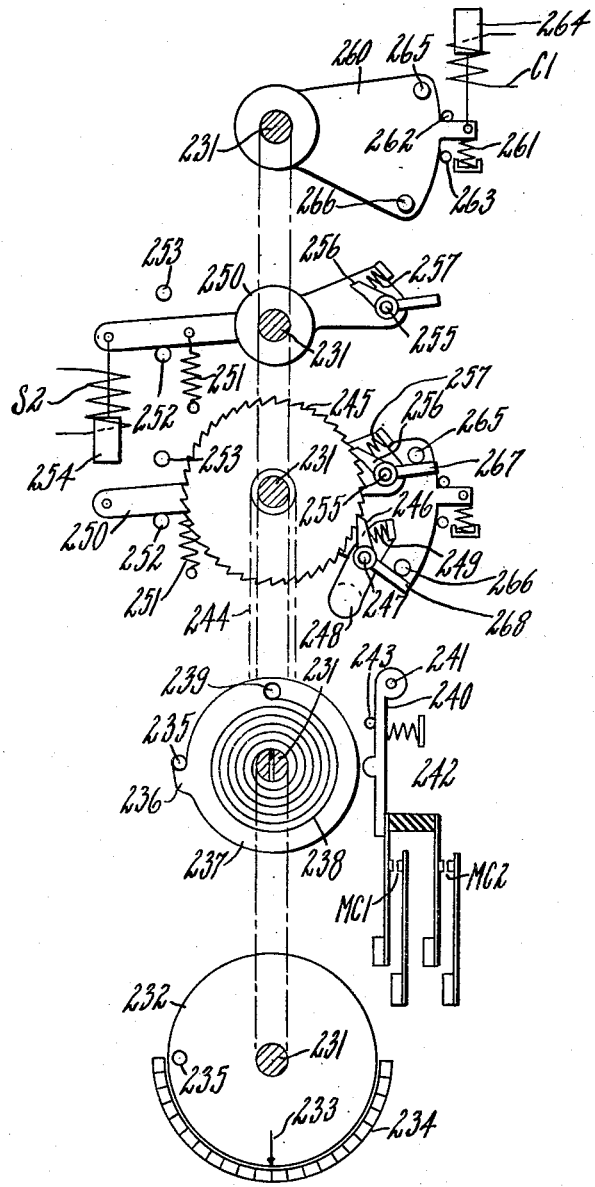

Fig. 17 is a diagram of a timer.

Figure 18:
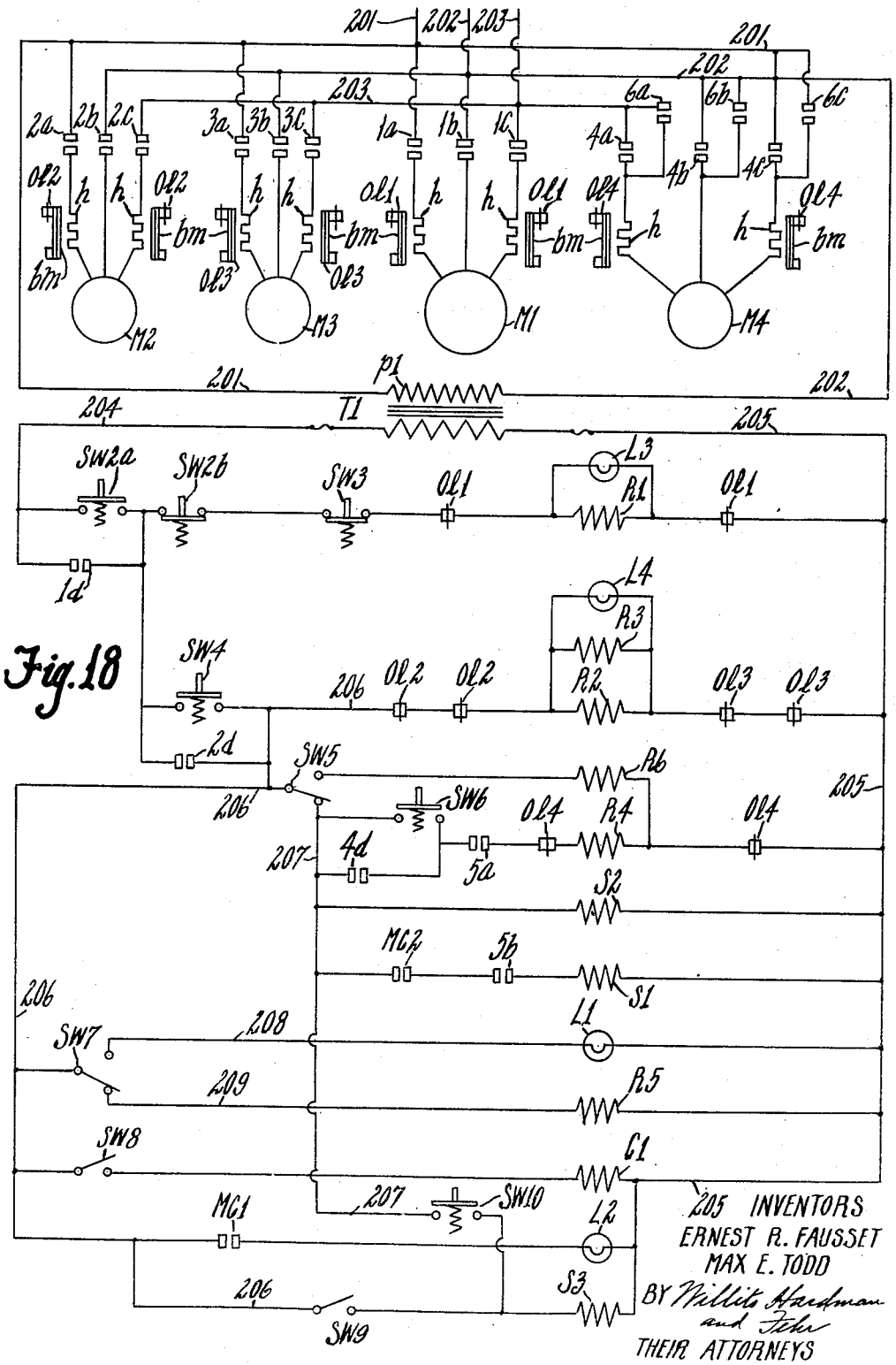

Fig. 18 is a wiring diagram.

Figure 3:
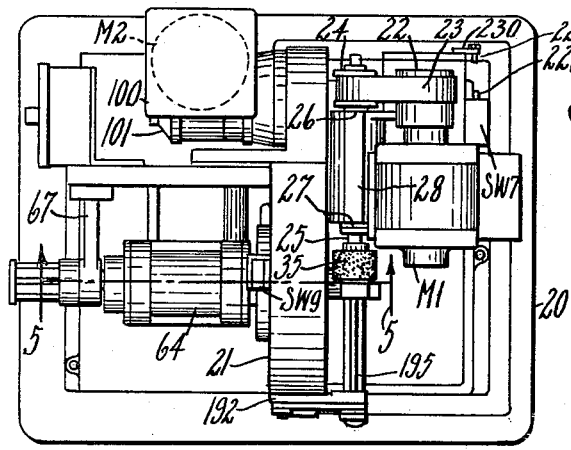
Fig. 3 is a view in the direction of arrow 3 of Fig. 1.
Figure 1:
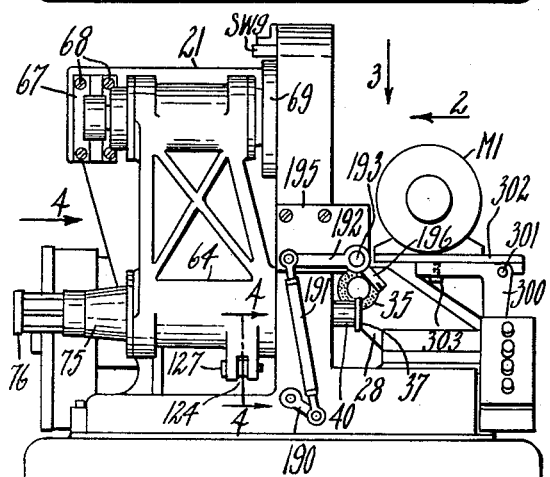
Fig. 1 is a side view of a machine embodying the present invention.

Referring to Figs. 1 to 3, the machine has a base structure 20 which encloses a mechanism for supplying the cooling liquid for the work. The base 20 supports a frame 21 which supports electric motors M1, M4 and M3 shown in Fig. 12. Motor M1 (Fig. 14) drives a pulley 22 connected by a belt 23 with a pulley 24 connected with a shaft 25 journaled in bearings 26 and 27 supported by a frame 28 slidable on a plate 29 and guided for horizontal movement axially of the shaft 25 by a dovetail plate 30 (Fig. 12) located between dovetail flanges 31 and 32 of frame 28, there being a gib 33 between flange 32 and the plate 30 which can be adjusted by a plurality of screws, one of which is shown at 34 in Fig. 12. Shaft 25 supports and drives a cup-shaped grinding wheel 35 (Fig. 14). A bracket 300 attached to frame 21 supports a rod 301 upon which a plate 302 supporting motor M1 is pivoted. A screw 303 threaded through bracket 300 is adjustable to take up slack in the belt 23.

Referring to Figs. 10 and 11, the work performed by the wheel 35 is to grind the curved edges 36 of cam lever arms provided by a plate 37 which has been brazed to a tubular shaft 38 integral with a cam 39, some of the parts 37, 38 and 39 being a sub-assembly forming a part of an ignition distributor of the type shown in Fitzsimmons Patent #1,753,564, granted April 8, 1930. Cam 39, which operates the ignition circuit breaker, is caused to rotate by an engine driven shaft which is connected with shaft 38 by a speed-responsive device having weights which move outwardly from the engine driven shaft under the action of centrifugal force against the action of the springs. These weights have lever arms engageable with the cam surfaces 36 of the arms of plate 37, thereby causing annular displacement of the cam 39 relative to the engine driven shaft whereby ignition timing is advanced as engine speed increases. In order that the ignition timing will be advanced properly with an increase of engine speed, the cams 36 are accurately shaped by grinding. The plate 37 is caused to turn clockwise (Fig. 11) while the shaft 38 moves bodily on the arcuate line 38a, said bodily movement being controlled by a master cam, so that the plate 37 will move from the full line position to the dot-dash line position 37' in a manner such that the cam surface 36 is abraded by the wheel 35 to receive the proper contour. Following this abrasion, the plate 37 moves to position 37" and is caused to turn about one-fourth revolution as the plate 37 returns to the full line position, thereby reversing the position of the arms of the plate 37. To obtain these movements, the plate 37 is mounted upon a rotating and oscillating work support 40 which is attached to a rod 41 which snugly receives the tubular shaft 38. The angular location of the plate 37 relative to the work support 40 is fixed by hole 42 which receives stud 43 attached to plate 37. Hole 42 is vented by cross passage 44 in support 40. To provide clearance for the wheel 35, the support 40 has notches 45.

Referring to Fig. 5, the work support 40 has an integral flange 50 which screws 51 (Fig. 6) attach to the flange 52 of a spindle 53. To secure alignment of support 40 and spindle 53, the latter has a central recess which receives an accurately fitting pilot portion 54 of part 40. A nut 55 received by the threaded portion 56 of the work support 40 clamps against the flange 50 a master control cam 57. Screws 58 secure to the nut 55 a disc 59 located close to a guard 60 attached to frame 21 and having a hole 61 of such size as to permit the oscillation of the spindle 53. Spindle 53 is journaled in bearings 63 supported by a swinging frame 64 supported upon bearings 65 supported by a fixed rod 66. Rod 66 is supported by a bracket 67 attached by screws 68 to frame 21 and has a flange 69 which screws 70 attach to frame 21. End play in spindle 53 is taken up by adjustment of nuts 71 threaded on the spindle 53 and the end play of frame 64 is taken up by adjustment of nuts 72. The chamber in the swinging frame 64 which receives the bearings 63 is closed at the right end by a seal 73 retained by a disc 74 and, at the left end, by a cap 75 which receives an air cylinder 76 containing a piston connected with rod 77 which extends through the spindle 53 and is guided by a bearing 78. Rod 77 has a head 79 (Figs. 5 and 5A) received by a pocket in a block 80 having a C-notch 80a which receives that portion of the rod 77 of smaller diameter than the head 79. To block 80 are attached two ejector rods 81 which when fluid pressure is admitted to the left end of cylinder 76, move to the right to eject the work from the rod 41.

The chamber enclosing bearings 65 is closed by caps 82, each supporting a seal ring 83. The rod 66 provides a journal 90 which supports roller bearings 91 received within a hub 92 of a sprocket 93 retained by nuts 94 threadedly engaging the rod 66. Hub 92 is connected with a disc 96 which screws 97 connect with a ring 98 and a sprocket 99 driven by a motor M4 in a manner to be described.

Referring to Figs. 2 and 3, motor M4 is under control by a brake 100 which is spring operated to stop the motor promptly when it is disconnected from the current source. While current is applied to the motor M4, the brake is retracted by an electromagnet in circuit with the motor. Motor M4 is supported by a speed reducer 101, which, as shown in Figs. 3 and 12, is supported by frame 21. Through the speed reducer, the motor M4 drives a shaft 102 connected with a sprocket 103 which, as shown in Fig. 6, is connected by a chain 104 with the sprocket 93 (Fig. 5). Chain 104 engages an idle sprocket 105 which, for purpose of taking up slack in the chain 104, is mounted for vertical adjustment on a plate 106 (Fig. 9). Plate 106 has slots 107 for receiving screws 108. Plate 106 supports a stud 109 which provides a journal for the sprocket 105 which is retained on the stud 109 by the washer 110 and a screw 111.

Sprocket 99 is connected by a chain 112 (Fig. 6) which is connected with a sprocket 113 (Fig. 5) provided by spindle 53. Chain 112 meshes with an idle sprocket 114 which, as shown in Fig. 5, is journaled on a cylinder 115 having a sprocket retaining head 116. Cylinder 115 is integral with an eccentric shank 117 which is received in a bore provided by the swinging frame 64 and which is retained by a nut 118. The loosening of nut 118 permits rotation of the shank 117 so that an adjustment of the axis of the cylinder 115 can be made to take up slack in the chain 112.

Figure 4:
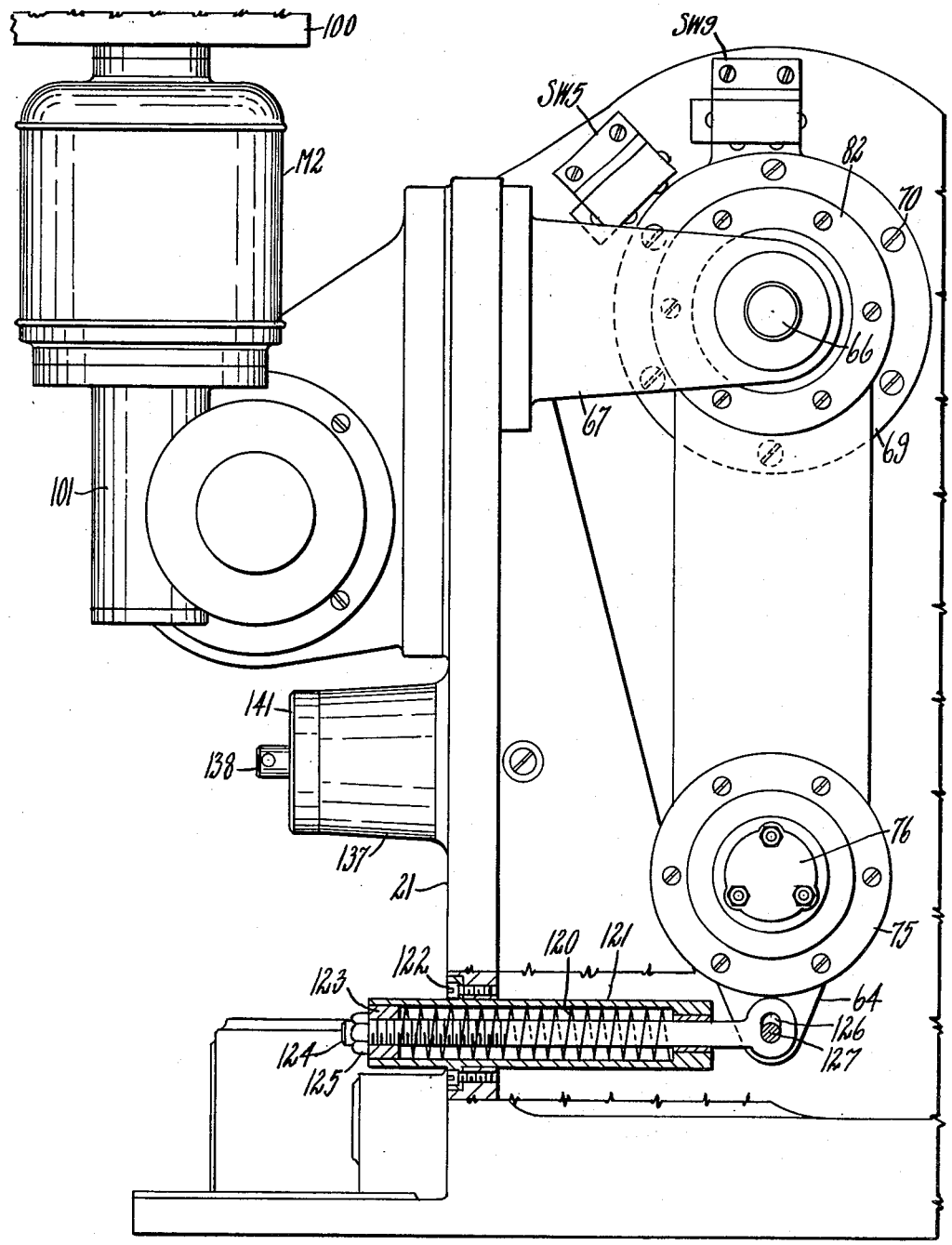
Fig. 4 is a view in the direction of arrow 4 of Fig. 1, the part in section being on the line 4—4 of Fig. 1.

It is therefore apparent that motor M4 rotates the spindle 53, thereby causing rotation of the workpiece plate 37 and the master control cam 57. During rotation of cam 57, it is urged to the right in Fig. 6 or to the left in Fig. 4 by a spring 120 retained in a tube 121 having a flange which screws 122 attach to frame 21. Spring 120 urges to the left a disc 123 threadedly connected with a rod 124 and locked in the desired position of adjustment by a nut 125. Rod 124 has a slot 126 for receiving a pin 127 attached to swinging frame 64. Spring 120 therefore urges frame 64 toward the left in Fig. 4 and the cam 57 to the right in Fig. 6 and into contact with a roller 128 which, as shown in Fig. 9, is pivotally supported by a screw 129 which is carried by a lever 130 and is retained thereon by a nut 131. Lever 130 is journaled on a screw 132 which extends through a retaining washer 133 and is threaded into a rod 134 and is retained in connection with the rod 134 by a nut 135. Rod 134 is guided for horizontal adjustment by bosses 136 and 137 provided by frame 21. This adjustment is effected by the turning of a screw 138 threadedly connected with rod 134 and having a flange 139 confined between discs 140 and 141 which screws 142 attach to the boss 137. As shown in Fig. 8, rod 134 is retained in adjusted position by pinch blocks 143 which a screw 144 clamps against the rod.

Lever 130 pivotally supports a roller 145 which the spring 120 (Fig. 4) urges into engagement with the ring 98 which has three lands 146, 147 and 148 successively engaged by the roller 145 as sprocket 99 rotates in a clockwise direction (Fig. 6). During one rotation of sprocket 99, sprocket 113 and hence the plate 37 supported by work-holder 40, rotates three times. During a single rotation of sprocket 113, both cam surfaces 36 of the arms of plate 37 are caused to engage the grinding wheel 35 in the manner determined by the cam 57. During the first of these rotations of the plate 37, the grinding wheel makes a cut of a depth which is determined by the adjustment of rod 134 (Fig. 6) and by the radius of the land 146 with which the roller 145 engages during this first revolution of the plate 37. During the next revolution, land 147 is engaged by roller 145. Since land 147 has a radius slightly less than the radius of land 146, an additional amount of metal is ground from the surfaces 36 of the plate 37 during this second revolution. During the third revolution of plate 37 when the land 148 engages roller 145, an additional amount of metal is ground from the cam surfaces 36. In this way, each cam surface 36 is ground to the required contour by three steps of grinding which results in more accurate work and less wear of the grinding wheel than if all the material were removed in one step.

Referring to Fig. 6, as the sprocket 113 swings to the left to position 113' corresponding to position 37'' of the work, rotative speed of the sprocket 113 clockwise decreases. This is true since, assuming no rotation of sprocket 99, sprocket 113 would rotate counterclockwise as it swings to position 113'. Therefore as the plate 37 swings to the left on the arc 38a, the speed of rotation of the plate 37 clockwise gradually decreases. This compensates, to a substantial degree, for the gradual decrease in abrasive speed of the grinding wheel 35 as the plate 37 rocks on the wheel from full line position 37 (Fig. 11) to dot-dash line 37'. Therefore, as grinding wheel speed decreases, the time of contact between the wheel 35 and an increment of the cam surface 36 will remain practically constant so that the rate of material removed will be substantially constant.

In order that the grinding wheel 35 will produce substantially uniform results, it is necessary to periodically dress the plane surface of the wheel. This is effected automatically by mechanism operated by motor M3 (Fig. 12) and under control by a timer to be described later. Motor M3 is supported by a speed reducer 150 supported by frame 21. Through gearing in the speed reducer, the motor M3 drives a sprocket 151 connected by a chain 152 with a sprocket 153 connectible with a shaft 154 through a clutch 155, said clutch being of the type known as "Hilliard" which is held out of engagement by the engagement of a latch 156 with the flat 157 of a disc 158 forming a part of the clutch. Latch 156 is connected with the armature 159 of a solenoid S1 (supported by a bracket 160, which guides latch 156) which, at a predetermined interval, controlled by a timer (to be described), is caused to be energized to retract the latch 156 from the disc 158 whereupon the sprocket 153 becomes connected with the shaft 154 and causes it to move counterclockwise thereby effecting rotation of a cam 161 driven by the shaft 154. As the cam 161 rotates, it pushes on a roller 162 pivotally supported by a bar 163 pivotally connected at 164 with a lever 165 pivotally connected at 166 with a bracket 167 attached to frame 21. Roller 162 is urged against the cam 161 by a spring 168 connecting bar 163 with bracket 167. Bar 163 is pivotally connected at 169 with a disc 170 which pivotally supports a pawl 171 urged clockwise by a spring 172 against a ratchet 173 (Fig. 14) which screws 174 attach to a hub 175 pinned to a shaft 176 having a squared end 177 for the purpose of receiving a wrench so that the shaft 176 can be turned manually for an initial adjustment. Shaft 176 is journaled in bearings 178 and 179 provided by frame 21 and is provided with a fine pitch screw 180 cooperating with a split nut 181 (Fig. 16) integral with a bracket 182 attached to frame 28. By turning a screw 183, the nut 181 can be clamped snugly around the screw 180. The solenoid S1 is energized momentarily so that shaft 154 makes only one revolution and then stops. During this revolution, shaft 176 is rotated in a direction such as to cause frame 28 and grinding wheel 35 to move toward the left in Fig. 14 and slightly closer to the axis of the work support 40. During this rotation of shaft 154, the dressing of the plane face of the wheel 35 takes place.

Referring to Fig. 13, it will be seen that shaft 154 is connected with a lever 190 which, as shown in Fig. 14, is connected by a link 191 with a lever 192 (also Fig. 1) connected with a shaft 193 journaled in bearings 194 provided by a bracket 195 attached to frame 21. Shaft 193 is connected with an arm 196 carrying a diamond pointed tool 197 which is caused to make one oscillation to dress the grinding wheel. Tool 197 (Figs. 11 and 11A) is received by a hole in arm 196 which is split at 196a to provide a clamp which receives a clamp tightening screw 196b. The initial location of tool 197 relative to wheel 35 is determined by a gauge 198 (Fig. 14) supported by a bracket 199 and having a plunger 200 into engagement with which the point of tool 197 can be brought by disconnecting link 191 and swinging the arm 196.

Referring to Figs. 5, 6 and 7, sprocket 99 has an arcuate slot 220 which receives an arcuate bar 221 attached by screws 222 to a plate 223 which a screw 224 attaches to the sprocket 99, there being a plurality of tapped holes 225 in sprocket 99, any one of which may receive the screw 224 to place the bar 221 in the desired position angularly relaive to the sprocket 99. Bar 221 provides a cam 226 which successively engages switch actuating rollers of switches SW5 and SW9, the roller 227 of switch SW9 shown in Fig. 5. Switch SW5 is first operated momentarily to effect, through a circuit to be described, the stopping of the machine at the end of its cycle. The machine does not stop instantly; when cam 226 presses the roller of switch SW5 towards its case; but comes to a stop position just beyond that in which the cam 226 had moved roller 227 of switch SW9 inwardly to energize solenoid S3 shown at the lower part of Fig. 18 to cause a valve (not shown) to admit compressed air to the left end (Fig. 5) of cylinder 76 to effect ejection of the work from the holder 40. When switch SW9 opens, solenoid S3 is deenergized and the valve returns to normal status to admit compressed air to the right end (Fig. 5) of cylinder 76 to effect left movement and retraction of ejecting rod 77.

Referring to Figs. 2 and 12, frame 21 supports a switch SW7 whose actuating plunger 228 is in alignment with a screw 229 adjustably mounted on a bracket 230 attached to the frame 28 which carries the grinding wheel 35 driven by motor M1. As wheel 35 wears down, frame 28 is shifted left (Fig. 2) periodically. When the wheel has been worn to an extent such that its plane surface is close to the wheel clamping nut 35n (Fig. 11), screw 229 engages plunger 228 to operate switch SW7 for the purpose of stopping the machine and preventing further operation thereof until the worn wheel has been replaced by a new one. In that replacement, nut 181 is returned to start position by turning screw 180 (Fig. 14) manually by a wrench applied to the squared end 177 of shaft 176.

The clutch 155, which controls the tool 197 (Fig. 11) and the advancing of the wheel 35, is under control by a timer shown in Fig. 17. A fixed rod 231 supports a rotatable timing disc 232 carrying an index mark 233 movable along a fixed scale 234. Disc 232 is moved to a desired position, indicated by the arm 233, which represents the number of machine cycles before the timer counts or "times" out. Disc 232 carries a pin 235 engaged initially by the lug 236 of a disc 237 rotatable on rod 231, the lug 236 being urged toward pin 235 by a torsion spring 238 connected at one end with rod 231 and, at the other end, with a pin 239 attached to disc 237. Lug 236 operates as a cam to operate a lever 240 pivoted at 241 and urged by a spring 242 toward a stop pin 243. The timer "times out" when lug 236 effects right movement of lever 240 to close switches MC1 and MC2.

Disc 237 is connected by a tube 244 journaled on rod 231 with a ratchet 245. Spring 238 urges ratchet 245 clockwise to cause a tooth thereof to press against a stop pawl 246 pivoted at 247 on a fixed bracket 248 and urged by a spring 249 against the ratchet 245. Ratchet 245 is moved step-by-step counterclockwise by a lever 250 journaled on rod 231 and movable by a spring 251 against a stop 252 and against a stop 253 by a solenoid S2 which attracts upwardly an armature 254 attached to lever 250. Lever 250 carries a pin 255 pivotally supporting a pawl 256 which a spring 257 urges against the ratchet. When solenoid S2 is energized, lever 250 moves clockwise to move the pawl 256 back along the ratchet. When solenoid S2 is deenergized, spring 251 moves lever 250 counterclockwise to effect movement of ratchet 245 by pawl 256.

The timer reset mechanism comprises a lever 260 journaled on rod 231 and urged by a spring 261 into engagement with a stop 262 and into engagement with a stop 263 by energization of a solenoid C1 which attracts an armature 264 connected with lever 260. Clockwise movement of lever 260 causes pins 265 and 266 carried thereby to engage tails 267 and 268 respectively of pawls 256 and 246, respectively, to cause them to retract from the ratchet 245 so that spring 238 returns lug 236 into engagement with pin 235 and switches MC1 and MC2 open. Solenoid C1 is controlled by switch SW8 (mounted on bracket 160, Fig. 12) which is caused to be closed momentarily during the latter portion of counterclockwise movement of cam 161 (Fig. 12). At the end of one revolution of shaft 154, switch SW8 opens and spring 261 restores lever 260 to normal position so that pawls 246 and 256 will engage the ratchet 245.

Referring to Fig. 18, current source wires 201, 202 and 203 are connectible with grinder motor M1, cooling liquid pump motor M2, dresser motor M3 and spindle motor M4 by magnetic switches having, respectively, coils R1, R2, R3 and R4 which, when energized, respectively, close contacts 1a, 1b, 1c, 2a, 2b, 2c, 3a, 3b, 3c and 4a, 4b, 4c. At a certain time, motor M4 is connected with wires 201, 202 and 203 also by a relay having a coil R6 which, when energized, closes contacts 6a, 6b, 6c in parallel, respectively, with contacts 4a, 4b, 4c.

Motors M1, M2, M3 and M4 are protected, respectively, by overload circuit breakers having normally closed pairs of contacts marked, respectively, 011, 012, 013, 014. Each pair of overload circuit breaker contacts is separated by a bimetallic blade $bm$ heated by a resistance element $h$ in a circuit to the motor with which the overload breaker is associated.

Wires 201, 202 are connected to the primary $p1$ of a transformer T1 having a secondary $s1$ connected with wires 204 and 205.

When placing the machine in operation, the grinder motor M1 is started first. This is effected by closing switch SW2a which energizes coil R1 which effects the closing of contacts 1a, 1b, 1c and 1d, the latter bypassing switch SW2a so that motor M1 remains in operation after switch SW2a is released. Lamp L3 burns to indicate operation of the grinder motor. To start motors M2 and M3, switch SW4 is closed to effect energization of coils R2 and R3 to effect closing of contacts 2a, 2b, 2c and 2d and contacts 3a, 3b, 3c. Since contacts 2d, when closed, bypass switch SW4, motors M2 and M3 remain operative after switch SW4 is released. Lamp L4 burns to indicate operation of motors M2 and M3.

Switch SW5 is normally in position to connect wires 206 and 207. Switch SW7 is normally in position to connect wires 206 and 209 thereby energizing relay coil R5 to effect closing of contacts 5a and 5b.

The workpiece is placed on the workholder 40, and the machine cycle is started by manually closing switch SW6 which effects energization of coil R4 to effect closing of contacts 4a, 4b, 4c, 4d, and motor M4 operates. Since contacts 4d, when closed, bypass switch SW6, motor M4 remains operative after switch SW6 is released. Near the end of one revolution of sprocket 99 (Fig. 6) the switch SW5 is momentarily moved to disconnect wire 207 from wire 206 to cause deenergization of coil R4 and solenoid S2 which controls the timer. Then solenoid S2 is deenergized to cause the timer to add one cycle to its previous count. When coil R4 is deenergized, motor M4 would stop before home position of sprocket 99 (Fig. 6) is reached. But momentary disconnection of wires 206, 207 is immediately followed by momentary connection of wire 206 with coil R6 so that contacts 6a, 6b, 6c close momentarily to continue operation of the motor momentarily so that its momentum will be such that application of the brake after coil R6 is deenergized will cause the motor M4 to coast sufficiently to bring sprocket 99 to the desired home position and to stop after switch SW9 has been momentarily closed to effect ejection of the work and subsequent retraction of the ejector so that the holder 40 can be reloaded.

The sprocket 99 stops with switch SW9 open and with eject solenoid S3 deenergized and with switch SW5 connecting wires 206 and 207 and solenoid S2 energized so that the lever 250 (Fig. 17) is moved against stop 253 preparatory to the next counting operation. The machine is now ready for reloading and repetition of its cycle.

After the predetermined number of cycles for which the timer is set, the timer causes its contacts MC1 and MC2 to close automatically. A lamp L2 burns to indicate the end of said number of cycles and that the grinding wheel is to be redressed; and solenoid S1 is energized and retracts the latch 157 of the clutch 155, and shaft 154 turns to cause axial shifting of the grinding wheel 35 and operation of the dresser. Before completion of one revolution of shaft 154, cam 161 closes switch SW8 (Fig. 12) momentarily to effect energization of solenoid C1 which resets the timer. As previously described, the resetting of the timer effects opening of contacts MC1 and MC2 thereby causing lamp L2 to go out and the deenergization of solenoid S1 whereupon the clutch 155 becomes disengaged at the end of one revolution of shaft 154. The machine is then ready for further operation.

When the grinding wheel 35 has been dressed down until the dresser is in danger of striking the wheel clamp nut 35n (Fig. 11), switch SW7 is caused to disconnect wires 206 and 209 and to connect wire 206 with wire 208 and lamp L1 burns to indicate that a new grinding wheel is required. Furthermore, coil R5 is deenergized to effect opening of contacts 5a and 5b thereby making it impossible to effect further operation of the machine or the dresser.

The machine may be stopped at any time by opening switch SW2b which is located close to the starter switch SW2a; and the machine may be stopped in emergency by opening emergency switch SW3 which may be one of several switches in series with switch SW2a located convenient to the operator.

Switch SW10 may be manually closed to effect ejection of the work by energization of solenoid S3 independently of switch SW9.

While the embodiment of the present invention as herein disclosed, constitutes a preferred form, it is to be understood that other forms might be adopted.

What is claimed is as follows:

1. A machine for grinding a contour on an edge of a blank and comprising, a grinding wheel having a plane abrading surface at right angles to its axis of rotation, means for rotating the wheel, a shaft supported for rotation on an axis parallel to the abrading surface and offset from the wheel axis, means supporting the shaft for lateral displacement relative to the wheel, a master cam supported by the shaft, a relatively fixed cam follower engaged by the cam, said cam having a contour for causing lateral displacement of the shaft coordinated with angular position thereof, a work-holder attached to the shaft and supporting the blank in such position that a portion of its edge relatively near to the shaft axis is engaged by a portion of the abrading surface relatively far from the wheel axis when the shaft is positioned by the cam close to the wheel as the shaft rotates and, when the shaft is positioned by the cam further from the wheel as the shaft rotates, a portion of the abrading surface closer to wheel axis engages a portion of the blank edge more remote from the shaft axis and a mechanism for imparting to the shaft rotary movement at lesser speed as the shaft moves laterally from the wheel and at greater speed as the shaft moves laterally toward the wheel whereby, as abrasive speed is greater or less, rotative speed of the shaft is greater or less.

2. A machine for grinding a contour on an edge of a blank, and comprising a fixed frame, a swinging frame supported for oscillation by the fixed frame, a shaft supported by the swinging frame on an axis parallel to the axis of oscillation of the swinging frame, a grinding wheel having a plane, blank-edge-abrading surface, means rotatably supporting the wheel so that the abrading surface is parallel to the shaft axis and so that the axis of the wheel is offset from the shaft axis, means for rotating the wheel, a relatively fixed cam follower, a master cam supported by the shaft for causing lateral displacement thereof coordinated with angular positions thereof as the shaft is rotated, a rotary motion transmitting means comprising a sprocket coaxial with the axis of oscillation of the swinging frame, a sprocket on the shaft and a chain connecting the sprockets whereby lateral displacement of the shaft away from the wheel is accompanied by rotation of the shaft in a certain direction and in the opposite direction when the shaft is displaced toward the wheel, means for rotating the first sprocket in such direction that rotation of the shaft by the transmitting means is in a direction opposite to the direction of shaft rotation due to lateral movement of the shaft away from the wheel, a work-holder attached to the shaft and supporting a blank in such position that a portion of its edge relatively near to the shaft axis is engaged by a portion of the abrading surface relatively far from the wheel axis when the shaft is positioned by the cam close to the wheel and, when the shaft is positioned by the cam further from the wheel, a portion of the abrading surface closer to the wheel axis engages a portion of the blank edge more remote from the shaft axis in consequence of which, as abrasion speed is greater or less, rotative speed of the shaft is greater or less.

3. A machine for grinding a contour on an edge of a blank and comprising, a grinding wheel having a plane abrading surface at right angles to its axis of rotation, means for rotating the wheel, a shaft supported for rotation on an axis parallel to the abrading surface and offset from the wheel axis, means supporting the shaft for lateral displacement relative to the wheel, a master cam supported by the shaft, a relatively fixed cam follower engaged by the cam, said cam having a contour for causing lateral displacement of the shaft coordinated with angular position thereof, a work-holder attached to the shaft and supporting the blank in such position that a portion of its edge relatively near to the shaft axis is engaged by a portion of the abrading surface relatively far from the wheel axis when the shaft is positioned by the cam close to the wheel as the shaft rotates and, when the shaft is positioned by the cam further from the wheel as the shaft rotates, a portion of the abrading surface closer to the wheel axis engages a portion of the blank edge more remote from the shaft axis, a mechanism for rotating the shaft a plurality of turns to cause the blank to contact the abrading surface a plurality of times, and means under control by said mechanism for changing position of the cam follower to cause the blank to be located closer to the wheel in a succeeding abrasion operation than in a preceding one.

4. A machine for grinding a contour on the edge of a blank and comprising a rotary shaft, a work-holder on the shaft for supporting the blank, a support for the shaft capable of lateral movement, a cam follower, a master cam supported by the shaft and engaged by the cam and having a contour such as to cause lateral movement of the shaft coordinated with angular positions thereof, an abrasion device engaged by the blank as the shaft rotates it and the cam positions it by lateral movement of the shaft support, mechanism for rotating the shaft, and means operated by the mechanism for moving the cam follower, after completion of an abrasion operation on an arm of the blank, in a direction such that the blank is moved closer to the abrasion device than during the preceding abrasion operation on said arm of the blank.

5. A machine according to claim 4 having means for stopping rotation of the shaft after completion of a predetermined number of abrasion operations.

6. A machine according to claim 4 having means for ejecting the blank from the workholder and having means for stopping rotation of the shaft after completion of a predetermined number of abrasion operations and for causing operation of the ejecting means.

7. A machine for grinding contours on edges of two oppositely extending arms of a blank and comprising a fixed frame, a swinging frame supported for oscillation by the fixed frame, a shaft supported by the swinging frame on an axis parallel to the axis of oscillation of the swinging frame, a grinding wheel having a plane, blank-edge-abrading surface, means rotatably supporting the wheel so that the abrading surface is parallel to the shaft axis and so that the axis of the wheel is offset from the shaft axis, means for rotating the wheel, a relatively fixed cam follower, a master cam supported by the shaft for causing lateral displacement thereof coordinated with angular position thereof as the shaft is rotated, a work-holder attached to the shaft and supporting the blank for engagement with said abrading surface of the wheel in a manner determined by the cam in coordination with angular position of the shaft, said cam contour also being such that, following an abrasion of one arm of the blank, the blank is retracted from the wheel and is turned during oscillation of the swinging frame to present the other arm of the blank to the wheel so that both arms are abraded once each during one revolution of the shaft, means for rotating the shaft and including a driving sprocket coaxial with the axis of oscillation of the swinging frame, a driven sprocket on the shaft and a chain connecting the sprockets, the diameter of the driving sprocket being three times the diameter of the driven sprocket, a movable support for the master cam follower, a second cam follower connected with the support, a second cam moving with the driving sprocket at the same speed and having three arcuate lands each of about 120° angular dimension and of different radii, and a spring which urges the master cam against the master cam follower and causes the master cam follower support to cause the second cam follower connected with said support to be urged against the second cam whereby the shaft is closer to the wheel preparatory to the second abrasions of both arms than for the first abrasions thereof and is closer to the wheel preparatory to the third abrasions of both arms than for the second abrasions thereof.

8. A machine for grinding contours on edges of two oppositely extending arms of a blank and comprising a fixed frame, a swinging frame supported for oscillation by the fixed frame, a shaft supported by the swinging frame on an axis parallel to the axis of oscillation of the swinging frame, a grinding wheel having a plane, blank-edge-abrading surface, means rotatably supporting the wheel so that the abrading surface is parallel to the shaft axis and so that the axis of the wheel is offset from the shaft axis, means for rotating the wheel, a relatively fixed cam follower, a master cam supported by the shaft for causing lateral displacement thereof coordinated with angular position thereof as the shaft is rotated, a work-holder attached to the shaft and supporting the blank for engagement with said abrading surface of the wheel in a manner determined by the cam in coordination with angular position of the shaft, said cam contour also being such that, following an abrasion of one arm of the blank, the blank is retracted from the wheel and is turned during oscillation of the swinging frame to present the other arm of the blank to the wheel so that both arms are abraded once each during one revolution of the shaft, means for rotating the shaft and including a driving sprocket coaxial with the axis of oscillation of the swinging frame, a driven sprocket on the shaft and a chain connecting the sprockets, the diameter of the driving sprocket being three times the diameter of the driven sprocket, a lever supporting at one end the master cam follower, a second cam follower supported by the other end of the lever, a second cam mounted on the driving sprocket and having three arcuate lands each of about 120° angular dimensions and having progressively shorter radii, an adjustable fulcrum rod supporting the lever between its ends, and a spring which urges the master cam against the master cam follower and causes the lever to press the second cam follower against the second cam whereby the shaft is closer to the wheel preparatory to the second abrasions of both arms than for the first abrasions thereof and is closer to the wheel preparatory to the third abrasions of both arms than for the second abrasions thereof.

9. In a machine for grinding a contour on a blank, the combination comprising, a rotary grinding wheel having a flat abrading surface for engaging the blank, a mechanism for turning the blank while moving it edgewise relative to the abrading surface to present different portions of the blank edge successively to said surface and including a drive shaft which rotates once for each cycle of abrading operations, an electric motor for driving said shaft, a relay switch including a magnet coil and operable by energizing its coil to connect the motor with a current source, manually operable means for causing energization of the relay coil, a first switch which, when actuated from normal status, causes deenergization of the relay coil, a second switch, means actuated by the shaft as it nears completion of one revolution for actuating said switches in succession, and means controlled by the second switch, when actuated, for causing ejection of a blank.

10. In a machine for grinding a contour on a blank, the combination comprising a rotary grinding wheel having a flat abrading surface for engaging the blank, a mechanism for turning the blank while moving it edgewise relative to the abrading surface to present different portions of the blank edge successively to said surface and including a drive shaft which rotates once for each cycle of abrading operations, an electric motor for driving said shaft, first and second relay switches each including a magnet coil and operable by energizing its coil to connect the motor with a current source, manually operable means for causing energization of the first relay magnet coil, a switch having a first or normal status in which it permits energization of the first relay magnet coil and prevents energization of the second relay magnet coil and having a second status for causing deenergization of the first relay magnet coil and energization of the second relay magnet coil, a cam moved by the shaft for momentarily actuating said switch from first to second status as one revolution of the shaft is nearly ended, a second switch actuated by said cam after it has actuated the first switch and means controlled by the second switch, when actuated, for causing ejection of a blank.

11. In a machine for grinding a contour on a blank, the combination comprising a rotary grinding wheel having a flat abrading surface for engaging the blank, a mechanism for turning the blank while moving it edgewise relative to the abrading surface to present different portions of the blank edge successively to said surface and including a drive shaft which rotates once for each cycle of abrading operations, an electric motor for driving said shaft, a relay switch including a magnet coil and operable by energizing its coil to connect the motor with a current source, manually operable means for causing energization of the relay coil, a first switch which, when actuated from normal status, causes deenergization of the relay coil, means moved by the shaft as it nears completion of one revolution for momentarily actuating said switch to effect deenergization of the relay magnet coil, a cycle counting timer, means under control by said switch when momentarily actuated for causing the timer to add, a second switch closed by the timer when it has counted to a certain number, a second mechanism for dressing the abrading surface of the wheel and for moving the wheel axially, a power driven second shaft for actuating said second mechanism during one revolution of the shaft, a one-revolution clutch for connecting the second shaft with the second mechanism, a solenoid energized by the closing of the second switch for causing the clutch to connect the shaft with the second mechanism, a third switch closed momentarily during rotation of the second shaft and a second solenoid energized by closing of the third switch for causing the timer to be reset whereby the first solenoid is deenergized and the second mechanism is disconnected from the second shaft at the end of one cycle of operation of the second mechanism.

ERNEST R. FAUSSET.
MAX E. TODD.

REFERENCES CITED

The following references are of record in the file of this patent:

UNITED STATES PATENTS

| Number | Name | Date |
|---|---|---|
| 957,392 | Thiel | May 10, 1910 |
| 1,883,016 | Shippey et al. | Oct. 18, 1932 |
| 1,901,236 | Guild | Mar. 14, 1933 |

FOREIGN PATENTS

| Number | Country | Date |
|---|---|---|
| 664,143 | Germany | Aug. 20, 1938 |